United States Patent
Szilagyi et al.

(10) Patent No.: US 6,522,793 B1
(45) Date of Patent: Feb. 18, 2003

(54) LOW VOLTAGE ELECTRO-OPTIC MODULATOR WITH INTEGRATED DRIVER

(76) Inventors: Andrei Szilagyi, 30917 Ganado Dr., Rancho Palos Verdes, CA (US) 90275; William K. Bischel, 740 Olive St., Menlo Park, CA (US) 94025; Konstantin P. Petrov, 1929 Crisanto Ave., #306, Mountain View, CA (US) 94040

(*) Notice: Subject to any disclaimer, the term of this patent is extended or adjusted under 35 U.S.C. 154(b) by 0 days.

(21) Appl. No.: 09/990,434

(22) Filed: Nov. 21, 2001

(51) Int. Cl.[7] .............................................. G02F 1/035
(52) U.S. Cl. ...................... 385/2; 385/3; 385/1; 385/14; 385/8
(58) Field of Search ............................ 385/2, 3, 1, 14, 385/8, 9, 28, 30, 40, 130, 131, 132

(56) References Cited

U.S. PATENT DOCUMENTS

| | | |
|---|---|---|
| 3,877,781 A | 4/1975 | Kaminow |
| 4,005,927 A | 2/1977 | Caton |
| 4,070,094 A | 1/1978 | Martin |
| 4,236,785 A | 12/1980 | Papuchon et al. |
| 4,843,586 A | 6/1989 | Nazarathy et al. |
| 4,936,645 A | 6/1990 | Yoon et al. |
| 5,036,220 A | 7/1991 | Byer et al. |
| 5,101,450 A | 3/1992 | Olshansky |
| 5,214,726 A | 5/1993 | Hockaday |
| 5,278,924 A | 1/1994 | Schaffner |
| 5,353,114 A | 10/1994 | Hansen |
| 6,091,864 A | 7/2000 | Hofmeister |
| 6,118,571 A | 9/2000 | Wessels et al. |
| 6,156,483 A | 12/2000 | McCoy et al. |
| 6,341,184 B1 * | 1/2002 | Ho et al. .................. 385/3 |

OTHER PUBLICATIONS

Howerton et al., "Fully Packaged, Broad–Band LiNbO3 Modulator with Low Drive Voltage", IEEE Photonics Technology Letters, pp. 792–794, V. 12, No. 7, Jul. 2000.
Wooten et al., "A Review of Lithium Niobate Modulators for Fiber–Optic Communications Systems", IEEE Photonics Technology Letters, pp. 69–81, V. 6, No. 1, Jan./Feb. 2000.
Chang et al., "Improved Electrooptic Modulator with Ridge Structure in X–Cut LiNbO3", J. Lightwave Technology, pp. 843–847, V. 17, No. 5 May 1999.
Becker et al., "High–Performance, High–Isolation Optical Guided–Wave Device Arrays", J. Lightwave Technology, pp. 260–266, V. 17, No. 2, Feb. 1999.
Noguchi, "Millimeter–Wave Ti:LiNbO3 Optical Modulators", J. Lightwave Technology, pp. 615–619, V. 16, No. 4, Apr. 1998.

* cited by examiner

Primary Examiner—Phan T. H. Palmer (57) ABSTRACT

An electro-optic modulator is provided which comprises an electro-optic substrate, a Mach-Zehnder Interferometer optical waveguide structure, and at least two electrodes. In an embodiment of the invention, the Mach-Zehnder Interferometer optical waveguide structure has a mode transition section for reducing the optical mode size and bringing the optical mode center closer to the upper surface of the electro-optic substrate. In another embodiment, there is a laterally recessed adhesion layer disposed between the electrodes and the electro-optic substrate. The recess in this adhesion layer minimizes the dissipative effect that the adhesion layer would ordinarily have on the propagation of RF energy along the electrode. In yet another embodiment, a dual drive arrangement is described for driving an electro-optic modulator. Finally, an integrated modulator array is described.

49 Claims, 6 Drawing Sheets

LOW VOLTAGE ELECTRO-OPTIC MODULATOR WITH INTEGRATED DRIVER

BACKGROUND OF THE INVENTION

1. Field of Invention

This invention relates generally to electro-optic (EO) modulators, and more particularly to lithium niobate Mach-Zehnder interferometer (MZI)-type modulators.

2. Description of the Prior Art

EO modulators are used to adapt an optical channel to carry information such as telephone calls and digital electronic data, for transmission over lightwave networks. Lithium niobate MZI-type modulators are known and described, for example, in E. L. Wooten, K. Kissa, et al., "A review of lithium niobate modulators for fiber-optic communications systems" IEEE Journal of Selected Topics in Quantum Electronics 6 (1) January/February 2000, pp. 69–82. Such modulators are typically adapted, for electrical signal input connection, with an RF waveguide electrode arrangement with "horns", as shown for example in M. M. Howerton et al., "Fully packaged, broad-band $LiNbO_3$ modulator with low drive voltage" IEEE Photonics Letters 12 (7) July 2000, pp. 792–794. The electrical signal connection is further constrained to a characteristic impedance of approximately 50 Ω for interfacing with coventional RF drive components. The combination of a horn electrode arrangement, RF drive (electrical signal input) connection by ribbon or wire bonds, and 50 Ω impedance, constrain existing modulators to relatively large sizes and high drive power requirements, which are obstacles to their integration in arrays. Improved EO modulators with smaller area and lower drive power requirements are therefore desirable, for next generation lightwave systems employing array components.

SUMMARY OF INVENTION

In accordance with an embodiment of the invention, a Mach-Zehnder modulator is provided which comprises a waveguide formed to enable formation of a tightly confined, "squeezed" optical mode with an elliptical mode profile, close to the optical chip surface, in order to achieve maximum overlap of the optical mode with the highest intensity regions of an electric field generated by RF electrodes.

In accordance with yet another embodiment of the invention, a Mach-Zehnder modulator is provided which comprises laterally recessed adhesion layer disposed between an electrode and the substrate, the adhesion layer recessed by a sufficient distance to minimize the dissipative (lossy) effect it would have on the propagation of RF energy along the proximal edges the electrode.

In accordance with a further embodiment of the invention, an electro-optic modulator is provided, configured to operate under dual drive conditions.

In accordance with yet a further embodiment of the invention, an integrated electro-optic modulator array is provided.

DETAILED DESCRIPTION

This invention provides an improved EO modulator device and method of RF drive connection. The device is constructed to overcome 'shortcomings associated with prior art devices, including 50Ω impedance and high drive voltage, RF power loss, large area, requirement for bias control, and difficulty of integration in array form. The device is suitable for use in lightwave transmission apparatus, especially in cases where such apparatus connects to a plurality of optical channels, and in other applications relating to lightwave transmission.

Figure 1:
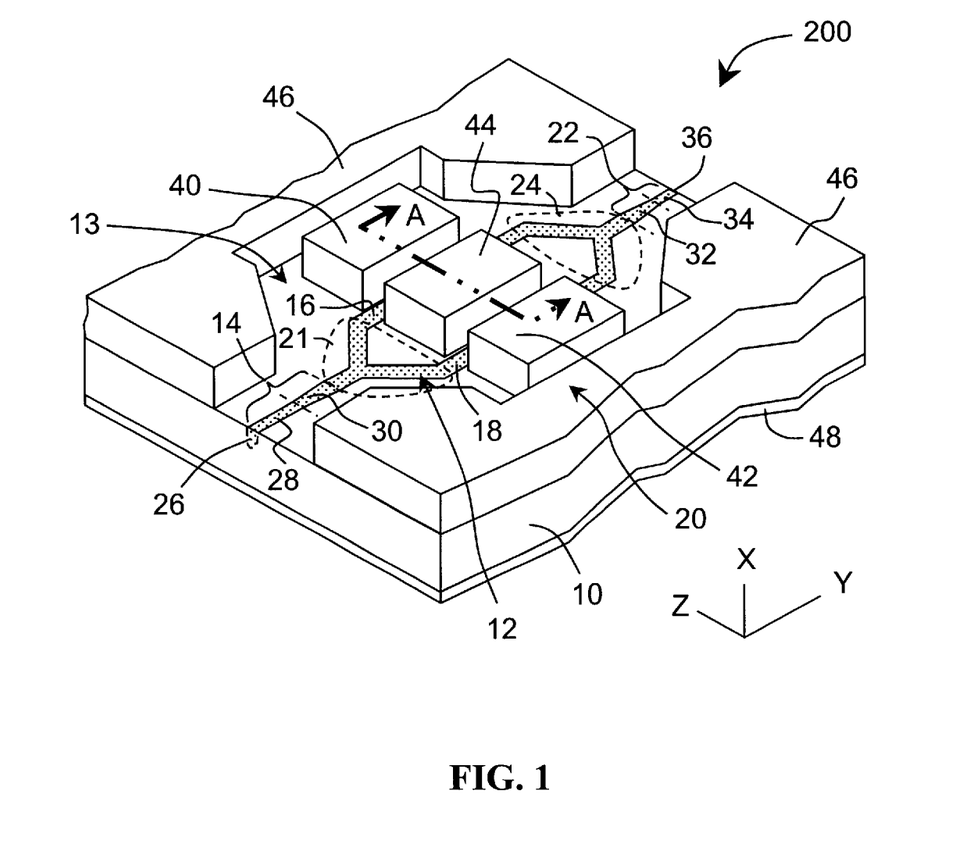
FIG. 1 is a symbolic oblique view of a Mach-Zehnder Interferometer Electo-Optic modulator according to an embodiment of the invention.
Figure 2:
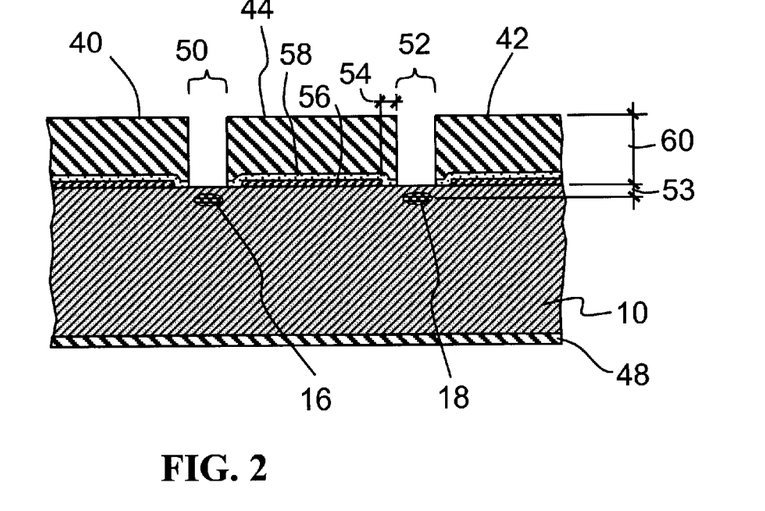
FIG. 2 is a cross-sectional view of the FIG. 1 device, showing in particular a squeezed optical mode and recessed adhesion layer.

FIGS. 1 and 2 depict elements of an EO modulator device 200 in accordance with an embodiment of this invention. EO modulator device 200 generally comprises an electro-optic substrate, for example an X-cut, or alternatively Y-cut, lithium niobate ($LiNbO_3$) substrate 10, a Mach Zehnder Interferometer (MZI) optical waveguide structure 12, and RF electrodes 20.

Mach Zehnder Interferometer optical waveguide structure 12 is formed on the upper surface 13 of the substrate 10, and comprises an input waveguide section 14 coupled to first ends of a first phase-shifting waveguide arm 16 and a second phase-shifting waveguide arm 18 by a first waveguide coupling means 21 (splitter), shown in FIG. 1 as a Y-junction, and an output waveguide section 22 coupled to second ends of first and second waveguide arms 16,18 by a second waveguide coupling means 24 (combiner), also shown in FIG. 1 as a Y-junction. Input and output sections 14 and 22 may terminate at opposite end faces of substrate 10.

It should be noted that in the interest of clarity, electrode terminations are not shown in the figures. Furthermore, the figures are not to scale and, in particular in FIG. 1, device 200 is depicted, for purposes of clarity, much shorter in the Y-direction (referring to the X-Y-Z orientation diagram) than preferred in actual embodiment.

The Mach-Zehnder interferometer optical waveguide structure 12 operates as follows. The carrier enters the Mach-Zehnder waveguide structure 12 via optical input port 26, and propagates along the input waveguide section 14. Input waveguide section 14 includes a narrow channel waveguide segment 28, and a mode transition section 30. The narrow channel waveguide segment 28 is of a suitably narrow channel width, as known in the art, to provide a loosely confined, symmetrical mode profile of appropriate (large) diameter for efficient coupling to optical fibers (not shown) external to the substrate 10, at the input port 26. The mode transition section 30 is interposed between the narrow channel waveguide segments 28 and the wider-channel waveguide of the first coupling means 21, and may comprise a tapered waveguide section chosen suitably for reducing the optical mode size and bringing the optical mode center closer to the upper surface of the substrate, and for efficient coupling and propagation of optical energy from a narrow to a wide channel waveguide portion, as known in the art. The mode transition section 30 may be a segmented tapered waveguide section, which is known in the art. In this manner, the optical mode will couple more efficiently into the first coupling means 21, and ultimately into the phase-shifting waveguide arms 16 and 18.

The waveguide channel width and optical mode properties of the first coupling means 21 can be chosen substantially similar to those of the first ends of the phase-shifting waveguide arms 16 and 18, to provide a tightly confined mode as described hereinabove also in the waveguide bends of the first coupling means 21, for good coupling and low optical loss. Waveguide arms 16 and 18 are preferably substantially aligned along the Y crystalline (axis) direction and disposed to be in close proximity to the RF electrodes 20. An electric signal applied to the electrodes causes electric fields to be produced, causing a local change in the refractive index of the waveguide arms 16,18, thus causing a relative phase shift between the optical signals propagating in the two arms 16 and 18. The relative phase shift preferably is proportional to the voltage of the applied electric signal. Waveguide arms 16 and 18 are chosen according to the invention to have a tightly confined, "squeezed" optical mode with an elliptical (cross-sectional) mode profile, close to the lithium niobate chip surface (see FIG. 2), in order to achieve maximum overlap of the optical mode with the highest intensity regions of a microwave/RF electric field generated by the RF electrodes 20.

The two optical signals propagating along waveguide arms 16 and 18 are recombined via second coupling means 24, interfering either destructively or constructively, depending on the relative phase shift introduced in the two waveguide arms 16, 18. The waveguide channel width and optical mode properties of the coupling means 24 can be chosen substantially similar to that of the second ends of the phase-shifting waveguide arms 16 and 18, to provide a tightly confined mode as described hereinabove also in the waveguide bends of coupling means 24, for good coupling and low optical loss.

The recombined optical signal then propagates along the output waveguide section 22. Output waveguide section 22 includes a mode transition section 32 and a narrow channel waveguide segment 34. The mode transition section 32 is interposed between the narrow channel waveguide segment 34 and the wider-channel waveguide of the coupling means 24, and may comprise a tapered waveguide section chosen suitably to provide efficient coupling and propagation of optical energy from a wide to a narrow channel waveguide portion, as known in the art, and to increase the optical mode size and lower the optical mode center in order to facilitate coupling of said mode to conventionally attached output optical fibers or other desired devices. The mode transition section 32 may be a segmented tapered waveguide section, which is known in the art. The narrow channel waveguide segment 34 is of a suitably narrow channel width, as known in the art, to provide a loosely confined, symmetrical mode profile of appropriate (large) diameter for efficient coupling to optical fibers (not shown) external to the substrate 10, at the output port 36. The resulting output at output port 36 is an optical signal the intensity of which varies as a function of the voltages of the electrical signals applied to the electrodes 20.

The optical waveguide structure 12 thus has, according to the invention, waveguide portions with two different optical mode profiles, a low loss one for efficiently coupling to optical fibers, and another more tightly confined one for efficient electro-optic modulation. The combination therefore allows for lower optical insertion loss while requiring a relative smaller electric field amplitude (i.e. low drive voltage) to effect extinction of the optical mode to thereby provide modulation of an optical signal.

The optical waveguides of structure 12 can be preferably formed by the annealed proton exchange (APE) technique, as known in the art, with optical waveguide channels defined by known masking techniques utilized with APE. Other known techniques of optical waveguide formation, such as Ti-indiffusion, for example, may alternatively be employed. Suitable channel widths can be, for example, in the region of 5.3 micrometers in the wide channel segments, namely the waveguide arms 16 and 18, and the coupling means 21 and 24; and in the region of 3.5 micrometers in the narrow channel waveguide segments 28 and 34, and the length of the waveguide arms 16 and 18 (in the Y direction for an X-cut substrate, or in the X-direction for a Y-cut. substrate) can be in the region of 20 millimeters.

It will be apparent to those familiar with the art that other electro-optic materials such as lithium tantalate ($LiTaO_3$), KTP, stoichiometric lithium niobate, magnesium-doped lithium niobate other ferroelectric materials, and electro-optic polymers, may be alternatively employed for the substrate 10, in place of lithium niobate, with appropriate changes in the optical waveguide formation techniques.

Figure 3:
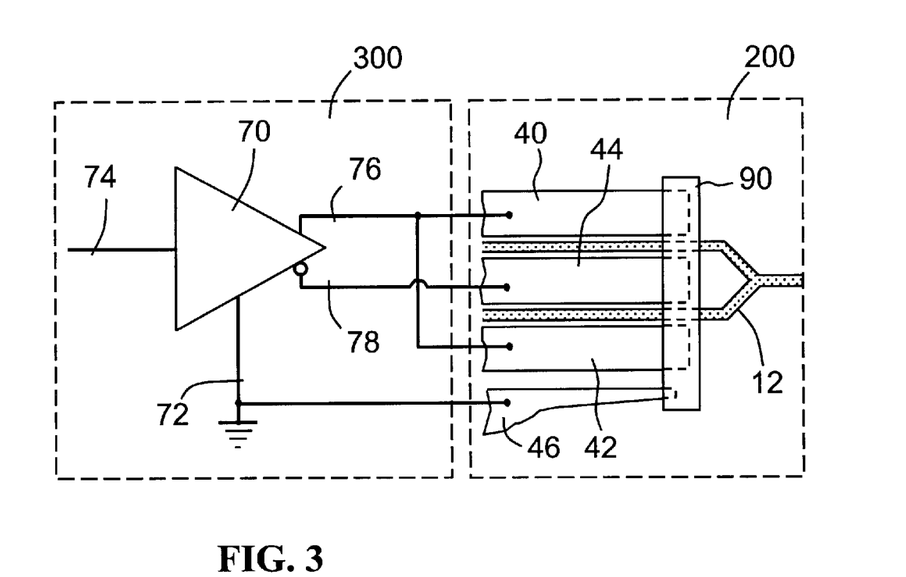
FIG. 3 is a schematic diagram of a dual drive connection for an Mach-Zehnder Interferometer modulator formed on an X or Y-cut Lithium-Niobate substrate.

Drive RF electrodes 20 are illustrated in FIGS. 1–3 to facilitate a dual drive arrangement. Electrodes 20 comprise signal electrodes 40 and 42, inverted (complementary) signal electrode 44, and ground electrodes 46 and 48, as shown in oblique symbolic view in FIG. 1, and in cross-sectional view in FIG. 2 taken along the line A—A (as identified in FIG. 1). The arrangement and geometry of the electrodes 20 is designed to bring two complementary microwave/RF (control) signals to the immediate vicinity of the MZI optical waveguide arms 16 and 18. In particular, a first signal is applied to electrodes 40 and 42; and simultaneously, a second signal, which is the inverted replica of the first signal, is applied to electrode 44.

Figure 7:
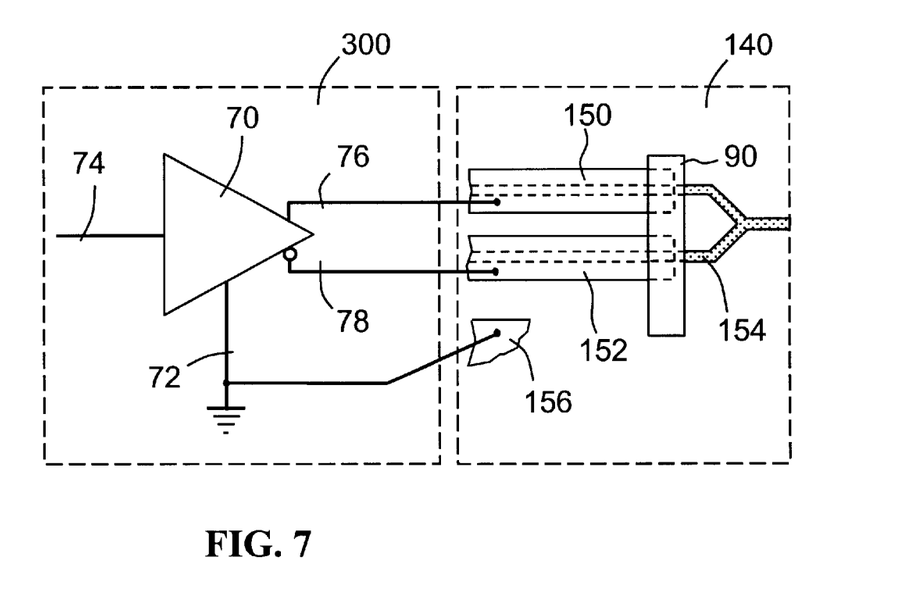
FIG. 7 is a schematic diagram of a dual drive connection for an Mach-Zehnder Interferometer modulator formed on a Z-cut substrate.

As known in the art, for an embodiment with X-cut (and alternatively, a Y-cut) substrate (as shown in FIGS. 1–3), the RF electrodes are preferably positioned with their gaps (defined herein as the lateral distance between adjacent electrodes), directly over the optical waveguide arms 16 and 18, and in an alternate embodiment with Z-cut substrate (as shown in FIG. 7), the RF electrodes themselves are preferably positioned to be substantially over the optical waveguide arms 16 and 18, in order to effect maximum electro-optic modulation. In thee embodiment of FIGS. 1–3, the gaps 50 and 52 can be chosen to be sufficiently wide, and the optical mode depth 53 can be chosen to be sufficiently large, to substantially eliminate overlap of the "squeezed" optical mode in the waveguide arms 16 and 18 with the electrodes 40, 42 and 44. This arrangement reduces insertion loss without use of a buffer layer (therefore minimizing the need for bias control) between the X-cut lithium niobate surface and the electrodes, while maintaining efficient electro-optic modulation. Signal electrodes 40, 42 and 44 can be suitably dimensioned to form an RF waveguide with RF phase velocity substantially matching, within a bandwidth, the optical phase velocity in waveguide arms 16 and 18, for efficient electro-optic modulation in a MZI structure as known in the art. The length of signal electrodes 40, 42 and 44 should preferably be approximately similar to the length of waveguide arms 16 and 18. Ground electrodes 46, and/or a ground plane electrode 48 which may be disposed on the back side of substrate 10 as shown in FIGS. 1 and 2, can be electrically connected together (externally to the lithium niobate substrate 10), or through vias, for example. The ground electrodes are disposed around the signal electrodes 40, 42 and 44 to form ground plane(s) that can effectively confine the RF fringing fields, at least with dual drive connection, as will be further described hereinbelow in connection with FIGS. 4 and 5.

Suitable materials for the electrodes 20 include gold and other metals having high electrical conductivity. The electrodes can be formed and patterned by known techniques such as sputtering, evaporation, electrodeless plating, electro plating, photolithograpy, wet (acid) etching, plasma etching, and liftoff. Adhesion layers can be used to enhance bonding of the electrode material to the lithium niobate surface; for example, a 50 nanometers thick layer of chromium, nickel or titanium, may be deposited on the surface, for example by sputtering, and then patterned by photoresist masking, exposure, development, and etching as known in the art, or a known liftoff process can be used to pattern the adhesion layer, prior to depositing high-conductivity gold. Typically a seed layer of gold can be deposited on the adhesion layer, and thick photoresist suitable to serve as a plating mask cab be laid down and patterned. Gold RF electrodes can then be electroplated on the unmasked portions of the seed layer as known in the art, to a desired thickness (height above the lithium niobate surface), for example 20 micrometers, and the photoresist can be stripped and the gold etched, milled, or otherwise removed, to remove the seed layer.

In an improved electrode construction method of this invention, an adhesion layer 56 can be made narrower than the desired RF electrode width as shown in FIG. 2, and a seed layer 58, which may be deposited on the adhesion layer 56, can be patterned to have the full desired RF electrode width. The seed layer 58 should have sufficient conductivity to carry the electroplating current required to enable electrode formation, adhere to both the adhesion layer 56 and the substrate 10, and be metallurgically compatible with the electrode material. For example, the seed layer 58 may be gold. A thick photoresist layer can be used to aid in controlling the shape of the side walls of an electroplated electrode, as known in the art, and this photoresist layer can be exposed to light through the lithium niobate substrate 10, thereby employing the seed layer 58 as a self-aligned mask for patterning the thick photoresist layer. The gold is then electroplated on the seed layer 58 to form an RF electrode 40, 42 or 44 of desired width and height (thickness) 60.

It will be appreciated by those skilled in the art that an RF field applied between two electrodes, for example electrodes 42 and 44 shown in FIG. 2, will be most intense across the gap 52 between the electrodes, and will be subject to the skin effect, whereby the field and its associated RF current are confined to a thin layer (skin) adjacent the outer surface of the electrode. An adhesion layer 56 such as chromium with significantly higher resistivity than the RF electrode 20 material can be recessed behind the electrode side surfaces (the proximal edges) facing each other across the gap 52, by a sufficient distance 54 to minimize the dissipative (lossy) effect it would have on the propagation of microwave/RF energy along the proximal edges of the electrode. The adhesion layer 56 is preferably laterally recessed by a distance 54, limited by possible delamination of the RF electrode from the lithium niobate surface, if the recessed distance 54 exceeds a significant fraction of electrode width.

It may also be preferable for the adhesion layer 56 to also extend upwardly (away from the upper surface 13 of the substrate 10) into a portion of the electrode 44, as indicated in FIG. 2.

An external signal is conventionally applied to an EO modulator through an RF driver, which can be a monolithic microwave semiconductor chip or hybrid integrated RF circuit, as known in the art. Referring to FIG. 3, driver 300 comprises drive amplifier 70 with ground 72 connected to ground electrodes 46 and 48 (48 is not shown); having a drive input 74 connected to an external signal source (not shown), a first drive output signal 76 connected to electrodes 40 and 42; and an inverted drive output signal 78 connected to electrode 44. It will be apparent to those familiar with the art, that the input 74 may be a single ended or a differential input signal.

Figure 4:
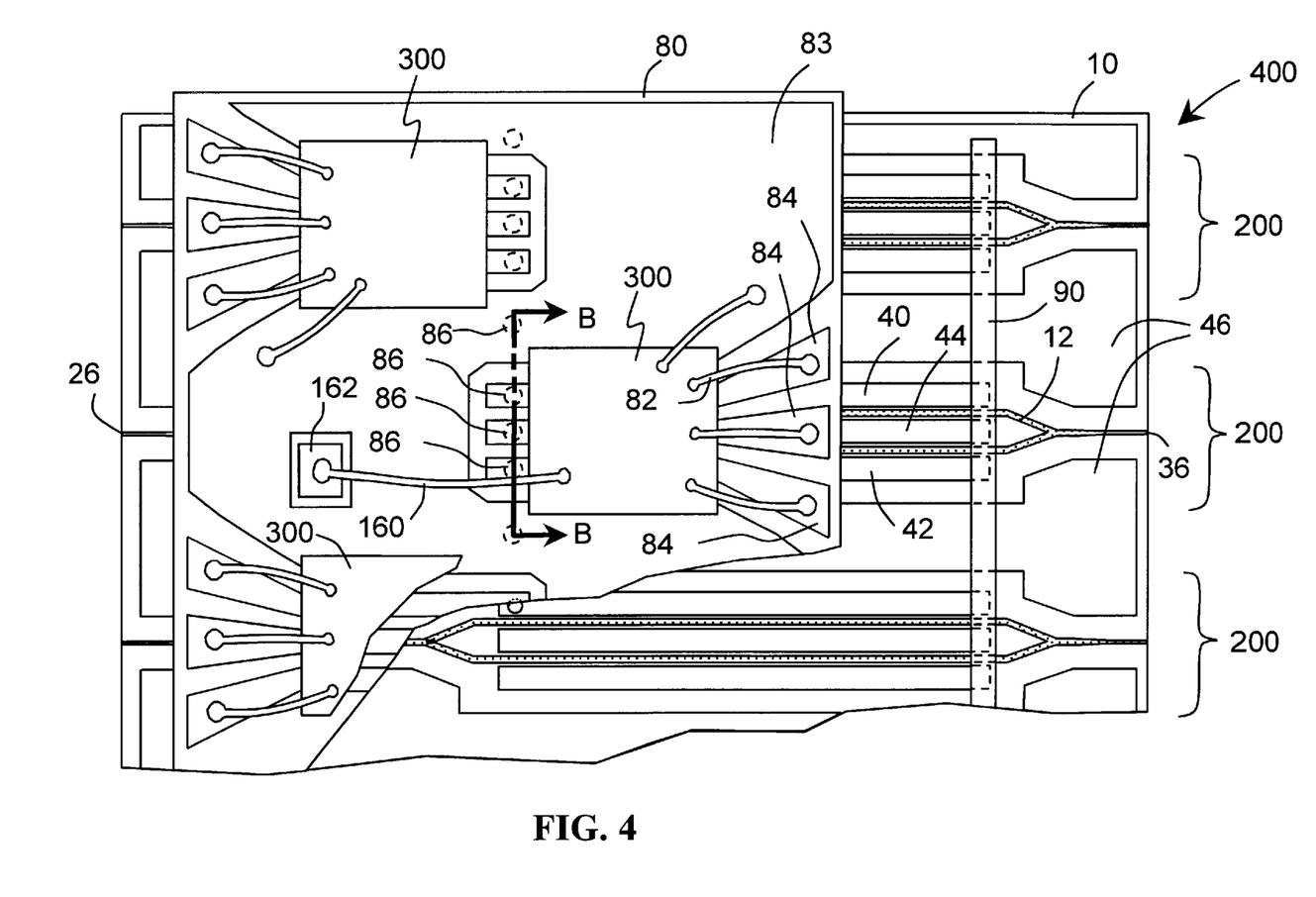
FIG. 4 is a symbolic plan view of an array integration structure for driver and modulator.
Figure 5:
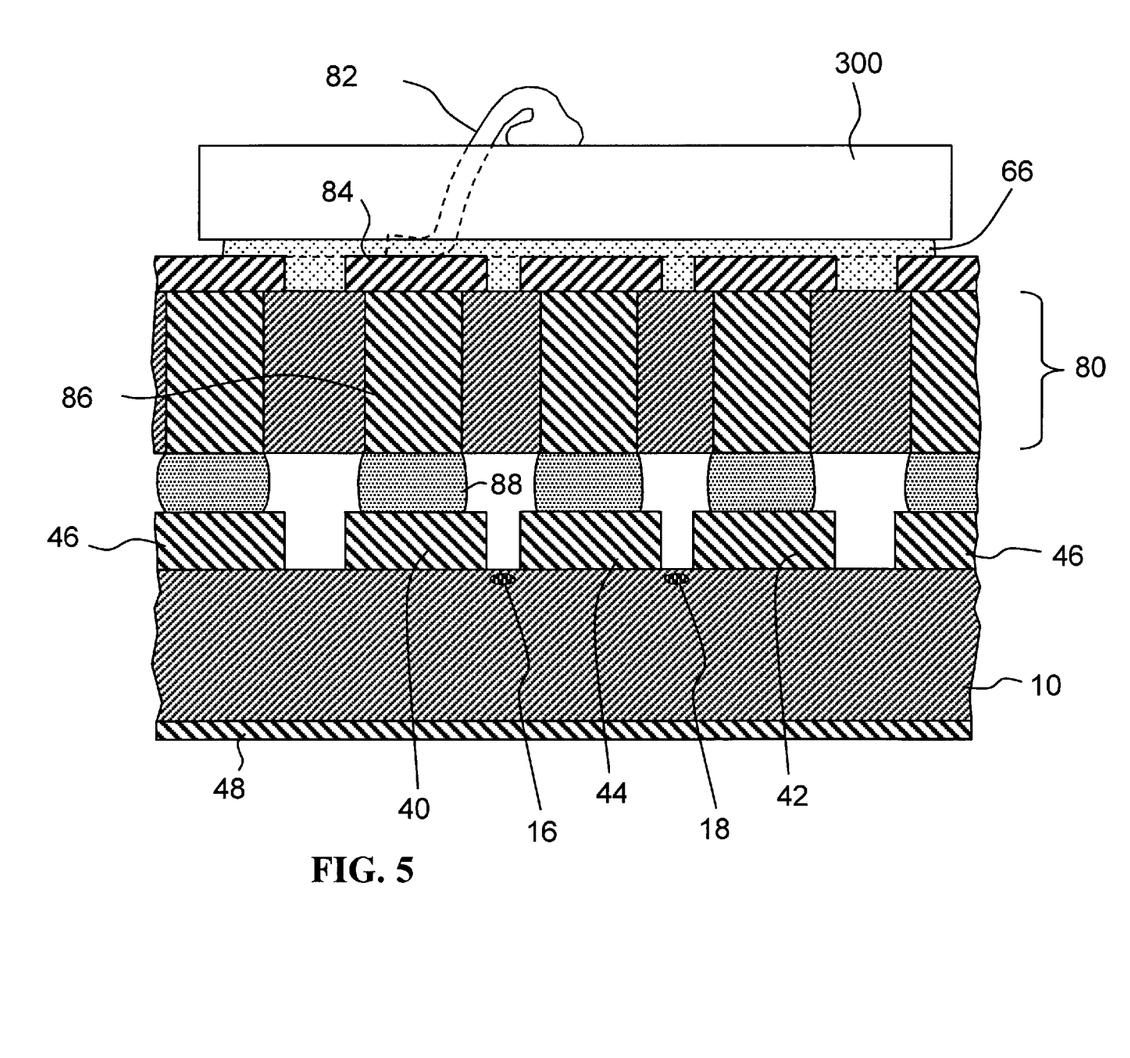
FIG. 5 is a symbolic cross-sectional view of an array integration structure taken along the line B—B of FIG. 4, showing in particular the flip chip attachment of the substrate.

The driver 300 can be in the form of an integrated circuit chip attached to a second substrate 80, as illustrated in FIGS. 4 and 5, and disposed in close proximity to the first substrate 10. As indicated in FIG. 5 the first output signal connection, which enables the drive output signal 76 to be conveyed to electrode 40, consists of a wire bond 82 from an output of the driver 300 to a drive electrode 84 (metallic trace) on the substrate 80. The connection continues through substrate 80 by means of a via 86 to solder ball 88, and ultimately to electrode 40. For ease of understanding, FIG. 5 shows only one connection, the connection to electrode 40, although it will be apparent that connections exist to the other electrodes too. A more detailed description of this connection arrangement will be described later. Alternatively, the driver chip 300 may be connected to the second substrate 80 by way of solder bumps utilizing the flip-chip technique; and further alternatively, the driver chip 300 and its connecting circuitry including the drive electrodes (as represented by drive electrode 84) may be monolithically integrated on the second substrate 80.

In an embodiment of the invention, the ground of the driver 300 may be electrically connected to the lower surface of the first substrate 10, the first substrate being metallized.

In a dual drive embodiment of the invention, drive output signals 76 and 78 are time-varying electrical voltages having opposite polarity with respect to a reference voltage level, that may be at zero volts (ground, 72) or may be some other bias voltage, according to the driver technology used. Preferably the impedances of the RF circuits connected to drive signals 76 and 78 are the same, and the driver can operate in a balanced or differential mode, in a symmetrical or asymmetrical manner. In this case, the sum of RF currents traveling at any device cross section through electrodes 40 and 42 will balance (i.e., be equal and opposite to) the current traveling at the same cross section through electrode 44, and electromagnetic radiation and RF crosstalk between adjacent EO modulator devices in an integrated array will be reduced, as will be further described hereinbelow. To enhance balancing of impedances, suitable output terminations 90 for the RF electrodes can be provided as known in the art, on the substrate 10, near the output end of the MZI optical waveyuide structure, as schematically indicated in FIG. 3. Alternatively, the ends of the electrodes may be connected through metallized vias to terminations located on top of second substrate 80.

FIGS. 6a–6e depict several alternative electrode geometries (which can be considered as transmission lines), in cross-sectional view, that may be employed for RF electrodes in the present invention. As shown, the preferred electrode structures are symmetrical in configuration, although asymmetrical configurations may be appropriately selected. Electromagnetic interference (EMI) and RF crosstalk are a major obstacle to integration of prior art EO modulator devices in arrays, that is overcome by the techniques of this invention. EMI properties of RF transmission lines that can be employed for RF electrodes in EO modulators are described with the help of in particular, the structure 540 shown in FIG. 6e, in which electrodes 122, 130, 132, and 134 correspond to electrodes 46, 40, 44, and 42, respectively, of RF electrodes 20 of the embodiment shown in FIGS. 1–3.

Figure 6A:
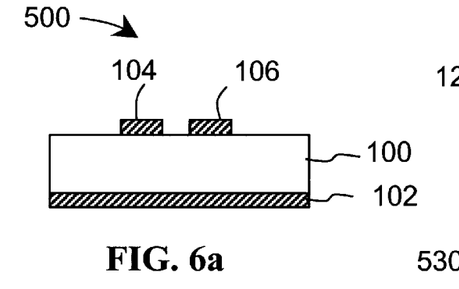
FIGS. 6a–6e are cross-sectional schematic diagrams of electrode structures that may be utilized in the current invention.
Figure 6B:
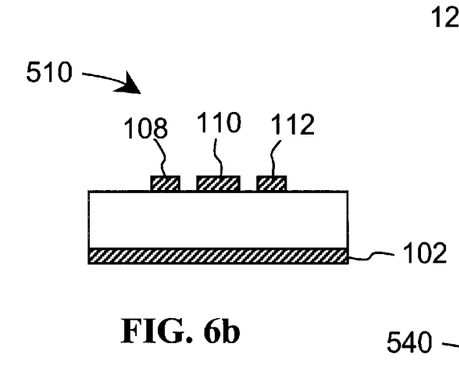

FIGS. 6a–6b illustrate two microstrip electrode configurations, with dielectric 100, and ground electrode 102. FIG. 6a represents a two-strip structure 500 which can be driven with the signal connected to signal electrode 104 and the inverted signal connected to signal electrode 106. FIG. 6b represents three-strip structure 510 which can be driven with the signal connected to signal electrodes 108 and 112, and the inverted signal connected to signal electrode 110. As known by those skilled in the art, th higher-order strip structures result in progressively higher-order multipole far-field emission patterns. The intensity of the electromagnetic radiation field generated by such structures decays faster, as a function of distance, the higher the order of a multipole emitter. Accordingly the two-strip structure will generate most EMI and RF crosstalk in an array of electrodes, and the three-strip structure and dual drive connection as described hereinabove and used in the preferred embodiment of the present invention, will generate least EMI and RF crosstalk.

Figure 6C:
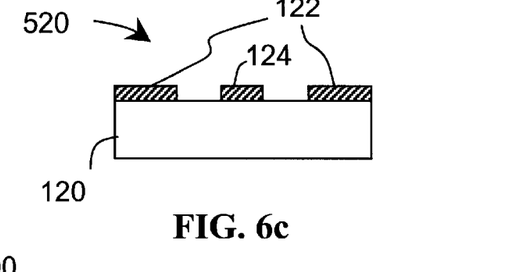
Figure 6D:
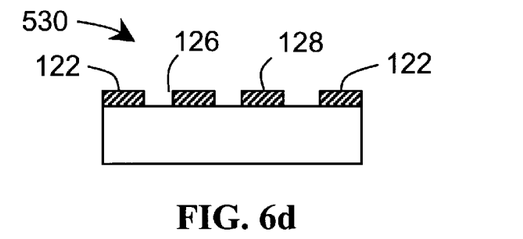
Figure 6E:
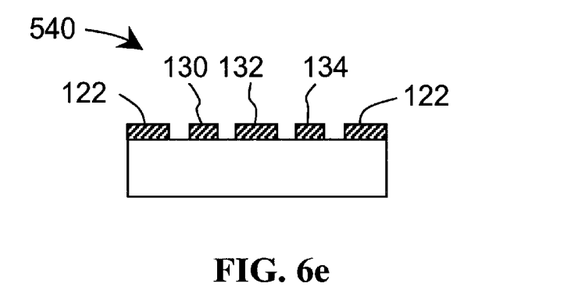

FIGS. 6c–6e show coplanar configurations, with dielectric 120, and coplanar ground electrodes 122. It should be understood by those skilled in the art that a backside metallization electrode 102 (not repeated in FIGS. 6c–6e) could further augment these structures. The single-strip coplanar electrode structure 520 depicted in FIG. 6c can be driven with the signal (or equivalently, the inverted signal) connected to signal electrode 124, resulting in a quadrupole electric field pattern. The two-strip coplanar electrode structure 530 of FIG. 6d can be driven with the signal connected to signal electrode 126 and the inverted signal connected to signal electrode 128. The three-strip coplanar electrode structure 540 of FIG. 6e can be driven, according to the invention, with the signal connected to signal electrodes 130 and 134, and the inverted signal connected to signal electrode 132. Once again, the higher-order co-planar structures result in progressively higher-order multipole far-field emission patterns. In each of the differentially driven electrodes above it is important for the two opposing currents to be balanced in magnitude, to avoid unwanted EMI (crosstalk in the case of an array) arising from current imbalances.

FIG. 7 depicts an alternate embodiment of the invention employing a Z-cut ferroelectric substrate 140. In this embodiment, the electrodes may be configured in the manner depicted in either FIGS. 6a or 6d. The RF signal electrodes 150 and 152 shown in FIG. 7, which are analogous to electrodes 126 and 128 of FIG. 6d, are connected to signal 76 and inverted signal 78 outputs of driver 300, and the two phase-shifting arms of the MZI optical waveguide structure 154 are positioned directly under the signal electrodes 150 and 152, as shown. In this embodiment ground electrodes 156 are analogous to electrodes 122 of FIG. 6d (and/or to electrode 102 of FIG. 6a).

It will be apparent to those familiar with the art that connection of dual drive output signals to adjacent RF electrodes, without an intervening ground electrode, according to this invention, will provide enhanced electrical field intensity. In particular, the application of RF electrodes according to the structure 510 or 540 (of FIGS. 6b and 6e) to the x- or y-cut EO modulator device 200 (and as shown in FIG. 1), with dual drive connection according to FIG. 3, benefits from a "push-pull" effect, wherein each of the amplifier outputs, even when driven alone will act on the two Mach-Zehnder waveguide arms with opposite phase effects, thus doubling their-contribution. Accordingly, these structures will achieve as much as twice the electrical field intensity as can be realized in an alternate design employing a Z-cut substrate, RF electrodes according to a modified structure 540 of FIG. 6e, in which there are dual drive connections with an intervening ground (with the drive signal connected to electrode 130, drive ground connected to 132 and 122, inverted drive signal connected to 134 and electrodes 130 and 134 positioned above the two MZ waveguide arms). Clearly the "push-pull" effect does not occur in this case.

Returning to FIG. 4, a fragmentary plan view of a modulator array 400 of EO modulator devices 200 and drivers 300 is depicted, in accordance with an embodiment of the invention. Although identical modulator devices 200 and drivers 300 are shown, it will be apparent to those skilled in the art that each of the modulators and drivers may possess their own set of specifications or operational parameters, and therefore may not be identical to one another. Integrated modulator array 400 comprises an X-cut lithium niobate (LiNbO$_3$) first substrate 10 with a plurality of EO modulators formed thereon, of which only three EO modulators 200 are shown; a second (driver) substrate 80 disposed substantially above and partially overlapping the upper surface of the first substrate 10; and a plurality of drivers 300, of which only three drivers 300 are shown, connected to driver substrate 80 and thence to the RF electrodes of the EO modulators 200. Each of the EO modulators 200 and each of the drivers 300 can be substantially similar, respectively, to the EO modulator 200 and the driver 300 described hereinabove in connection with FIGS. 1–3, and 6–7. The EO modulators 200 can be disposed on substrate 10 at substantially regular intervals and aligned with their principal optical propagation axis direction (which is usually the longest dimension) parallel to each other (along the Y-crystalline direction). It should be noted that FIGS. 4–5 are not to scale and in particular the EO modulators 200 are depicted in FIG. 4 much shorter in their long dimension than preferable in an actual implementation. A plurality of EO modulators 200 can be constructed on substrate 10 at the same time by using substantially the same fabrication procedure as that used to construct a single EO modulator 200, with appropriate array patterning masks for defining the MZI optical waveguide structures 12 and RF electrodes 20. Economy of scale is thus provided by the invention.

A second substrate 80, comprising drive electrode 84, provides physical and electrical interconnection between the EO modulators 200 and the drivers 300 of the array. This second substrate 80 can also be the interface for connecting external electrical modulating signals, electrical power, and external ground to the drivers. It will be apparent to those familiar with the art that although the three drivers 300 shown are depicted in a chip form and shown to be electrically connected by wire bonds in FIGS. 4–5, they may alternatively be incorporated and electrically connected in or on the second substrate 80 in other suitable ways, such as for example by monolithic integration on a second substrate 80, made of silicon, gallium arsenide, etc. According to the embodiment depicted in FIG. 4, a conductive metal pattern forming drive electrodes 84 is disposed on the upper surface of second substrate 80. This pattern substantially corresponds to the RF electrode 20 pattern of the EO modulator 200 on substrate 10. Further, a corresponding pattern of vias 86 (conductively lined or filled holes) extends vertically (perpendicularly to the upper surface) partially or all the way through the second substrate 80. The drive electrodes 84 and vias 86 serve to electrically connect the RF electrodes 20 (for example indicated in FIG. 4 as 40, 42, 44 and 46) of the modulators 200 to the drive signal outputs of drivers 300.

As shown in FIGS. 4–5, drive electrode 84 can be suitably disposed on the upper surface of substrate 80, in the region of driver 300, to substantially overlap at one end corresponding RF electrodes 40, 42, 44 and 46 of EO modulator 200, and also overlap corresponding vias 86 which extend through the second substrate 80. This can be more clearly seen in FIG. 5, which is a cross-sectional view taken along the line B—B of FIG. 4. As shown in FIG. 5, the vias 86 connect to corresponding drive electrodes 84 on the upper surface of second substrate 80, and are bonded and make contact, through solder bumps or solder balls 88, at the lower surface of substrate 80, to corresponding RF electrodes 40, 42, 44 and 46 on first substrate 10. A multiplicity of solder bumps can be bonded substantially simultaneously by the flip-chip technique as known in the semiconductor packaging art.

Alternatively, the second substrate 80 may have, in addition to the vias 86, larger metal areas (not shown) on the lower surface, overlapping the ground electrode areas 46 on the lithium niobate first substrate 10, that may be bonded with solder during flip-chip attachment, for stronger mechanical connection to substrate 10. Still stronger mechanical connection to substrate 10 can be achieved by providing an insulating fill adhesive. Drive electrodes 84 can extend along the substrate surface under driver 300, as shown in FIG. 4, and widen sufficiently, for wire bonding at their other ends to corresponding ground and drive output contact pads (not shown) on the driver chip. A typical bond wire 82 is identified in FIGS. 4 and 5. It will be apparent to those skilled in the art that the widened ends of drive electrodes 84 are similar to the known "horns", which by their disposition on the second substrate 80 according to the invention, can overlay (be effectively folded on top of) the EO modulator 200, and can thereby greatly reduce the overall area of the device and facilitate integration in arrays. Disposition of metal portions on the second substrate 80 according to the invention enables enhanced ground plane management, for example, by having a continuous drive ground electrode 83 (ground plane) surrounding other drive electrodes, as shown in FIG. 4, free from constraints regarding proximity of conductive materials to optical waveguides that would exist on first substrate 10. It should be further apparent that although a particular arrangement and disposition of drive electrodes is shown, other geometries, patterns and disposition of such electrodes may be employed in association with a substrate to accomplish the same function, without departing from the teaching of the invention. In particular, a drive ground electrode 83 may completely surround electrodes 84.

The second substrate 80 can be a multilayer dielectric substrate formed by techniques and materials known in the art, and it should be understood that it can have other vias for connecting other parts of the driver circuit, such as electrical control signal input and electrical power connections, by intermediate conductive patterns, to external contact areas that can be disposed at the periphery of the second substrate 80 (not shown). Multilayer substrates can be constructed from alternating layers of conductive and insulating materials, for example metallic materials such as copper, aluminum, gold, molybdenum, tungsten, invar, and chromium, and insulating materials such as alumina ceramic, glass ceramic, polymers, and or glass filled polymers such as FR-4, and composite materials.

The driver 300 can also have other electrical connections to the second substrate, as shown for example in FIG. 4 by wire bond 160, connecting to electrode 162, which may be further connected by a via to an aforementioned intermediate conductive layer in the second substrate 80. Other such metal portions and bond wires that may be desirable according to the application are omitted from FIGS. 4–5 for purposes of clarity. A driver chip 300 can be attached to second substrate 80 by a known technique, for example by an insulating adhesive material 66. Alternatively, the driver can be monolithically integrated on a silicon or gallium arsenide driver second substrate 80 having multilayer metallization, with drive signal output and ground connections made directly to drive electrodes by metallic traces in a suitable metallization layer, for example the upper layer.

The types of fabrication mentioned herein will preferably result in the creation of an integrated optical circuit, rather than a circuit consisting entirely of discrete components. Strictly speaking, integrated optical circuits are optical circuits that have optical functions fabricated or integrated onto/into a planar substrate. The planar substrate used during manufacturing of an integrated optical circuit may be sliced up into individual devices, commonly referred to as "chips", the optical version of an electronic integrated circuit. As commonly used, the term integrated circuits includes both monolithic and hybrid circuits. In monolithic circuits, all the components used for the device, such as waveguide circuits, the drivers and output optical circuitry are integrated on a single substrate. In the case of hybrid circuits, at least one additional component (which may or may not be a chip) are coupled with at least one integrated optical circuit. Integrated optics typically have a number advantages over conventional optical systems composed of discrete elements. These advantages include a reduced loss (since alignment issues are subject to better control), and smaller size, weight, and power consumption. In addition there is the improved reliability, the reduction of effects caused by vibration, and the possibility of batch fabrication, leading ultimately to reduced cost to the customer. Trading off against these advantages is the requirement that the fabrication processes are applied sequentially to the same substrate. As a result, process steps must be compatible with the results of preceding steps, and the yields of each step multiply. In cases where process steps may be incompatible, multiple separate components may be used in a hybrid configuration. Then the compatibility requirement applies separately to each component, but the alignment and reliability issues become more difficult. Clearly the tradeoff between these factors requires a detailed analysis in each separate case.

The integrated drivers of the modulator array 400 and/or EO modulator device 200 of the invention may be adapted with any of the following known drive formats: NRZ (Non-Return To Zero), RZ (Return To Zero), PM (Phase Modulation), and a combination of PM with NRZ or RZ, which is CRZ (Chirped Return to Zero). In these drive formats, NRZ, RZ, and CRZ have at least some AM (Amplitude Modulation), and may have also PM.

A modulator array of this invention may contain a tandem combination of two EO modulators in series, both of which can be amplitude modulated. The first EO modulator can, for example, provide clock pulse modulation, and the second can provide data modulation; if the clock pulse is short the modulator can launch a soliton for long distance transmission over an optical fiber.

A transmission laser array (or bar) may be combined with a modulator array of the invention, by butt coupling the laser waveguides into the MZ waveguides, or, for example, by using a fiber ribbon array to couple optical energy to the input ports 26 (see FIG. 4); or alternatively a single (laser) light source may be split by a series of optical fiber junction dividers, and coupled to the input ports 26 of the array, or yet alternatively an optical waveguide dividing structure as known in the art, may be provided on the lithium niobate substrate 10 before the MZI patterns, for splitting a single input light source.

The output ports of a modulator array according to the invention may be multiplexed together into a single optical fiber, for example by suitable optical fiber couplers, as known in the art; or alternatively the outputs may be multiplexed together into a single output waveguide by a series of optical waveguide junctions disposed on the lithium niobate chip.

An array of wavelengths sources, for example spaced on the International Telecommunications Union grid, each coupled to an EO modulator and integrated driver according to the invention, can be multiplexed together to one fiber.

A transmission laser array driver and the driver chips of the modulator array of this invention may be attached to one heat sink, to enable use of one thermal control system for both.

Unless otherwise specified, the term "substantially" is used herein to accommodate tolerances including manufacturing tolerances and optical tolerances. Omission of the word "substantially", however, should not be taken to require that such tolerances are not to be accommodated, since no real-world manufacturing process can be perfect.

It should be recognized that the terms upper and lower are used to denote position relative to the substrate and are not intended to refer to different parts of the structure if the structure is inverted or rotated.

The foregoing description of embodiments of the present invention has been provided for the purposes of illustration and description. It is not intended to be exhaustive or to limit the invention to the precise forms disclosed. In the interest of clarity of the invention, the illustrations and textual description of the embodiments described herein contain a number of simplifications and omissions that will be recognized by those skilled in the art. Obviously, many modifications and variations will be apparent to those skilled in the art. These variations are intended to be included in aspects of the invention. In addition, various features and aspects of the above described invention may be used individually or in combination. The embodiments described herein were utilized to explain the principles of the invention and its application, thereby enabling others skilled in the art to understand the invention for various embodiments and with various modifications as are suited to the particular use contemplated. Accordingly, it is intended that the scope of the invention be defined by the following claims and their equivalents, and the claims be construed in view of the full breadth and spirit of the invention.

What is claimed is:

1. An electro-optic modulator comprising:
   an electro-optic substrate having an upper surface;
   a Mach-Zehnder Interferometer optical waveguide structure formed in the substrate, said Mach-Zehnder Interferometer optical waveguide-structure comprising an input section, an output section, first and second arms, coupling means coupling said first and second arms to said input and said output sections respectively; and
   at least two electrodes formed on said substrate and configured to facilitate production of electric fields which at least partially overlap said first and said second arms;
   wherein at least the input section has a mode transition section for reducing the optical mode size and bringing the optical mode center closer to the upper surface of the substrate.

2. An electro-optic modulator according to claim 1, wherein said electro-optic substrate comprises a ferroelectric material.

3. An electro-optic modulator according to claim 2, wherein said substrate has an X-cut orientation.

4. An electro-optic modulator according to claim 2, wherein said ferroelectric material is lithium niobate.

5. An electro-optic modulator according to claim 1, further comprising a laterally recessed adhesion layer disposed between at least one of said at least two electrodes and said electro-optic substrate.

6. An electro-optic modulator according to claim 5, wherein said laterally recessed adhesion layer extends upwardly into a portion of said at least one electrode.

7. An electro-optic modulator according to claim 1, further comprising a second substrate, said second substrate comprising drive electrodes configured to facilitate electrical coupling to said electrodes on said electro-optic substrate;
   said second substrate disposed in close proximity to said electro-optic substrate.

8. An electro-optic modulator according to claim 7, wherein said second substrate is disposed substantially above and at least partly overlapping said electro-optic substrate.

9. An electro-optic modulator according to claim 1, wherein said electrodes are coplanar.

10. An electro-optic modulator according to claim 1, wherein said electrodes have an impedance of less than 50 ohms.

11. An electro-optic modulator according to claim 1, wherein said output section of the Mach-Zehnder Interferometer optical waveguide structure has a mode transition section for increasing the optical mode size and lowering the optical mode center away from the upper surface of said electro-optic substrate.

12. An electro-optic modulator according to claim 1, wherein said optical waveguide structure is formed by an annealed proton exchange method.

13. An electro-optic modulator comprising:
   an electro-optic substrate having an upper surface;
   a Mach-Zehnder Interferometer optical waveguide structure formed in said substrate, said Mach-Zehnder Interferometer optical waveguide structure comprising an input section, an output section, first and second arms, coupling means coupling said first and said second arms to said input and said output sections respectively;
   at least two electrodes formed on the substrate and configured to facilitate production of electric fields which at least partially overlap said first and said second arms; and
   a laterally recessed adhesion layer disposed between at least one of said at least two electrodes and said substrate.

14. An electro-optic modulator according to claim 13, wherein said laterally recessed adhesion layer extends upwardly into a portion of said at least one said electrode.

15. An electro-optic modulator according to claim 13, further comprising a second substrate disposed substantially above and at least partly overlying said electro-optic substrate,
said second substrate comprising drive electrodes configured to facilitate electrical coupling to said electrodes on said electro-optic substrate.

16. An electro-optic modulator comprising:
a ferroelectric substrate having an upper surface which is oriented substantially parallel to the Z-axis direction;
a Mach-Zehnder Interferometer optical waveguide structure formed in said substrate, said Mach-Zehnder Interferometer optical waveguide structure comprising an input section, an output section, first and second arms, coupling means coupling said first and said second arms to said input and said output sections respectively, and having its principal waveguide propagation axis oriented substantially transverse to the Z-axis direction;
and electrodes formed on the substrate, said electrodes forming a balanced three-strip transmission line, configured to operate under dual drive conditions, and facilitating electric fields to be produced which at least partially overlap said first and said second arms.

17. An electro-optic modulator according to claim 16, further comprising a laterally recessed adhesion layer disposed between said electrodes and said substrate.

18. An electro-optic modulator according to claim 17, wherein said laterally recessed adhesion layer extends upwardly into a portion of said electrodes.

19. An electro-optic modulator according to claim 16, wherein at least said input section has a mode transition section for reducing the optical mode size and bringing the optical mode center closer to the upper surface of said substrate.

20. An electro-optic modulator according to claim 16, further comprising a second substrate-disposed substantially above and at least partly overlying said electro-optic substrate,
said second substrate comprising drive electrodes configured to facilitate electrical coupling to said electrodes on said electro-optic substrate.

21. An electro-optic modulator according to claim 16, wherein said electrodes comprise at least two ground electrodes, and said ground electrodes are co-planar.

22. An electro-optic modulator comprising:
a ferroelectric substrate having an upper surface which is oriented substantially parallel to the Z-axis direction;
a Mach-Zehnder Interferometer optical waveguide structure formed in said substrate, said Mach-Zehnder Interferometer optical waveguide structure comprising an input section, an output section, first and second arms, coupling means coupling said first and said second arms to said input and said output sections respectively, and having its principal waveguide propagation axis oriented substantially transverse to the Z-axis direction; and
electrodes formed on the substrate, said electrodes comprising at least three signal electrodes and at least one ground electrode, wherein said signal electrodes are positioned such that there is no said ground electrode in between them.

23. An electro-optic modulator according to claim 22, further comprising a laterally recessed adhesion layer disposed between said plurality of electrodes and said substrate.

24. An electro-optic modulator according to claim 23, wherein said laterally recessed adhesion layer extends upwardly into a portion said electrodes.

25. An electro-optic modulator according to claim 22, wherein at least said input section has a mode transition section for reducing the optical mode size and bringing the optical mode center closer to the upper surface of said substrate.

26. An electro-optic modulator according to claim 22, further comprising a second substrate disposed substantially above and at least partly overlying said electro-optic substrate,
said second substrate comprising drive electrodes configured to facilitate electrical coupling to said electrodes on said electro-optic substrate.

27. An electro-optic modulator according to claim 22, wherein said at least one ground electrode is co-planar.

28. An electro-optic modulator comprising:
a ferroelectric substrate having a Z-cut orientation;
a Mach-Zehnder Interferometer optical waveguide structure formed in said substrate, and comprising an input section, an output section, first and second arms, and coupling means coupling said first and said second arms to said input and said output sections;
and at least two electrodes formed on the substrate, wherein said electrodes form a balanced two-strip transmission line, and are configured to operate under dual drive conditions, and-enable electric fields to be produced which at least partially overlap said first and said second arms.

29. An electro-optic modulator according to claim 28, further comprising laterally a recessed adhesion layer disposed between said plurality of electrodes and said substrate.

30. An electro-optic modulator according to claim 29, wherein said laterally recessed adhesion layer extends upwardly into a portion said electrodes.

31. An electro-optic modulator according to claim 28, wherein at least said input section has a mode transition section for reducing the optical mode size and bringing the optical mode center closer to the upper surface of said substrate.

32. An electro-optic modulator according to claim 28, further comprising a second substrate disposed substantially above and at least partly overlying said electro-optic substrate,
said second substrate comprising drive electrodes configured to facilitate electrical coupling to said electrodes on said electro-optic substrate.

33. An electro-optic modulator according to claim 28, wherein said electrodes comprise at least two ground electrodes, and said ground electrodes are co-planar.

34. An electro-optic modulator comprising:
a ferroelectric substrate having a Z-cut orientation;
a Mach-Zehnder Interferometer optical waveguide structure formed in said substrate, and comprising an input section, an output section, first and second arms, and coupling means coupling said first and said second arms to said input and said output sections; and
electrodes formed on the substrate, said electrodes comprising at least two signal electrodes and at least one ground electrode, wherein said signal electrodes are positioned such that there is no said ground electrode in between them.

35. An electro-optic modulator according to claim 34, further comprising a laterally recessed adhesion layer disposed between said electrodes and said substrate.

36. An electro-optic modulator according to claim 35, wherein said laterally recessed adhesion layer extend upwardly into a portion said electrodes.

37. An electro-optic modulator according to claim 34, wherein at least said input section has a mode transition section for reducing the optical mode size and bringing the optical mode center closer to the upper surface of said substrate.

38. An electro-optic modulator according to claim 34, further comprising a second substrate disposed substantially above and at least partly overlying said electro-optic substrate, said second substrate comprising drive electrodes configured to facilitate electrical coupling to said electrodes on said electro-optic substrate.

39. An electro-optic modulator according to claim 34, wherein said at least one ground electrode is co-planar.

40. An integrated electro-optic modulator array comprising:

an electro-optic substrate having an upper surface;

a plurality of Mach-Zehnder Interferometer optical waveguide structures formed in the substrate, each said Mach-Zehnder Interferometer optical waveguide structure comprising an input section, an output section, first and second arms, coupling means coupling said first and second arms to said input and said output sections respectively; and a plurality of electrodes formed on the substrate and configured to facilitate production of electric fields which at least partially overlap said first and said second arms of said plurality of optical waveguide structures.

41. An integrated array according to claim 40, wherein at least said input section has a mode transition section for reducing the optical mode size and bringing the optical mode center closer to the upper surface of said substrate.

42. An integrated array according to claim 40, further comprising a plurality of laterally recessed adhesion layers disposed between said plurality of electrodes and said substrate.

43. An integrated array according to claim 40, wherein said laterally recessed adhesion layers extend upwardly into a portion said plurality of electrodes.

44. An integrated array according to claim 40, further comprising a second substrate disposed substantially above and at least partly overlying said electro-optic substrate, said second substrate comprising drive electrodes configured to facilitate electrical coupling to said electrodes on said electro-optic substrate.

45. An integrated array according to claim 40, wherein said electrodes comprise at least two ground electrodes, and said ground electrodes are co-planar.

46. An integrated array according to claim 40, wherein said upper surface is oriented substantially parallel to the Z-axis direction;

said Mach-Zehnder Interferometer optical waveguide structures have their principal waveguide propagation axes oriented substantially transverse to the Z-axis direction; and said electrodes form a plurality of balanced three-strip transmission lines, configured to operate under dual drive conditions, and facilitating electric fields to be produced which at least partially overlap said first and said second arms.

47. An integrated array according to claim 40, wherein said substrate is oriented substantially parallel to the Z-axis direction;

said Mach-Zehnder Interferometer optical waveguide structures have their principal waveguide propagation axes oriented substantially transverse to the Z-axis direction; and said electrodes comprise at least three signal electrodes and at least one ground electrode, wherein said signal electrodes are positioned such that there is no said ground electrode in between them.

48. An integrated array according to claim 40, wherein said substrate has a Z-cut orientation;

and said electrodes form a plurality of balanced two-strip transmission lines, and are configured to operate under dual drive conditions, and facilitating electric fields to be produced which at least partially overlap said first and said second arms.

49. An integrated array according to claim 40, wherein said substrate has a Z-cut orientation; and said electrodes comprise at least two signal electrodes and at least one ground electrode, wherein said signal electrodes are positioned such that there is no said ground electrode in between them.

* * * * *